(12) United States Patent
Noelle (10) Patent No.: US 7,340,895 B2
(45) Date of Patent: Mar. 11, 2008

(54) TURBOCHARGER ACTUATOR (75) Inventor: Philippe Noelle, Vincey (FR)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/504,193

(22) PCT Filed: Feb. 8, 2002

(86) PCT No.: PCT/EP02/01962

§ 371 (c)(1), (2), (4) Date: Apr. 29, 2005

(87) PCT Pub. No.: WO03/067050

PCT Pub. Date: Aug. 14, 2003

(65) Prior Publication Data

US 2005/0217266 A1 Oct. 6, 2005

(51) Int. Cl.
- F02B 37/04 (2006.01)
- F02B 37/02 (2006.01)
- F02B 37/013 (2006.01)
- F02B 37/22 (2006.01)
- F02B 33/44 (2006.01)
- F16K 47/00 (2006.01)
- F16K 31/00 (2006.01)

(52) U.S. Cl. .................. 60/602; 251/123; 251/61; 29/888.011

(58) Field of Classification Search .............. 60/602, 60/605.3; 415/150, 160; 251/123, 61; 29/888.011; F02B 37/04, 37/02, 37/013, 37/014, 37/22; F01D 17/16, F01D 9/04

See application file for complete search history.

(56) References Cited

U.S. PATENT DOCUMENTS

| 3,153,988 | A | | 10/1964 | Warstler | |
|---|---|---|---|---|---|
| 4,377,070 | A | | 3/1983 | Shadbourne | 60/602 |
| 4,446,949 | A | * | 5/1984 | Weber | 188/79.55 |
| 4,716,735 | A | * | 1/1988 | Ruf et al. | 60/605.3 |
| 5,148,678 | A | * | 9/1992 | Ueda et al. | 60/602 |
| 5,231,831 | A | | 8/1993 | Leavesley | 60/602 |
| 5,746,058 | A | | 5/1998 | Vertanen | 60/602 |
| 5,934,642 | A | * | 8/1999 | Pearson et al. | 251/61 |
| 6,430,929 | B2 | * | 8/2002 | Martin | 251/123 |
| 6,883,317 | B2 | * | 4/2005 | Heath | 60/602 |
| 6,895,947 | B2 | * | 5/2005 | Allmang et al. | 60/602 |
| 2003/0185672 | A1 | * | 10/2003 | Suganami et al. | 415/150 |

OTHER PUBLICATIONS

PCT ISR, filed Oct. 4, 2002, Honeywell.

* cited by examiner

Primary Examiner—Thai-Ba Trieu
(74) Attorney, Agent, or Firm—John Griecci (57) ABSTRACT A turbocharger actuator and method of calibrating for a variable nozzle turbocharger. Included are an actuator housing having a diaphragm connected across it, a piston, and a compression spring arranged to be generally centered in the actuator housing biasing the piston. Three rivets connect the actuator housing to a bracket. The diaphragm is crimped to connect to the actuator housing, which is coated with an elastomeric bead. The bracket includes three plate sections, the first having a plurality of rivet holes, and second two each having an elongated hole to receive an attachment bolt and allow sliding movement of the actuator assembly relative to the turbocharger housing.

19 Claims, 6 Drawing Sheets

TURBOCHARGER ACTUATOR

The present invention relates to a turbocharger actuator and a method of calibrating the actuator. It is particularly applicable to a variable nozzle turbocharger (VNT).

BACKGROUND OF THE INVENTION

Turbochargers are used extensively in modern diesel engines to improve fuel economy and minimize noxious emissions. Traditionally a turbocharger comprises a turbine wheel in a chamber within a turbine housing, a compressor wheel and housing, and a central cast bearing housing for journaling a shaft which connects the compressor and turbine wheels. The turbine wheel rotates when driven by exhaust gasses from an internal combustion engine and causes the compressor wheel to rotate and compress air for delivery to the engine at a rate that is greater than the rate the engine can naturally aspirate. The turbocharger pressure output is a function of component efficiencies, mass flow through the turbine and compressor and the pressure drop across the turbine.

A VNT typically comprises a substantially cylindrical piston received within the turbine housing concentrically aligned with the rotational axis of the turbine. The piston is longitudinally movable to set the area of the inlet nozzle to the turbine from the volute so as to modulate the performance of the turbocharger for different operating conditions. The piston is moved by an actuator which is usually pneumatically operated and which is attached to the turbine housing by a bracket. It is necessary to calibrate the actuator when it is fitted.

Traditionally a VNT is calibrated using two fixed end points with a manually adjustable connecting rod and end. The rod and end is held in place by a locknut and the actuator assembly is held by two bolts and nuts. Conventional parts of a VNT are difficult to fit and adjust in confined spaces, and the manual calibration process reduces assembly line productivity, increases costs and tends to be relatively unreliable.

There is a need for a more robust actuator design and calibration process to enable automatic calibration and compact turbocharger installations, as well as to increase assembly line productivity and reduce the cost of an actuator. It is also desirable to make the calibration process more reliable and reduce the warranty returns, for example for loss of calibration.

BRIEF SUMMARY OF THE INVENTION

According to one aspect of the present invention there is provided an actuator for a variable nozzle turbocharger, comprising: an actuator housing; a piston; a diaphragm, connected across the actuator housing; at least one compression spring arranged to be generally centred in the actuator housing and to bias the piston; a spaded rod, connected to the piston, for calibrating a turbocharger, and a bracket comprising a first planar portion for fixedly connecting to the actuator assembly, and at least one second portion extending generally perpendicular to the first portion and having an elongate hole formed therein to receive means for attaching the bracket to the turbocharger housing, the elongate hole allowing a sliding movement of the actuator assembly relative to the turbocharger housing.

Preferably the actuator housing is connected to the bracket using at least one, and preferably three, rivets. The diaphragm may be crimped to connect it to the actuator housing and it may be coated with elastomer bead to improve and control the crimping process.

Advantageously the shape of the piston in the actuator is modified to reduce the overall length of the actuator.

According to a preferred embodiment the bracket comprises a third portion extending perpendicular to the first portion and being generally parallel to the second portion and the third portion having an elongate hole formed therein to receive a bolt to attach the bracket to the turbocharger housing, the elongate hole allowing a sliding movement of the actuator assembly relative to the turbocharger housing.

Preferably the elongate holes allow around 4 mm of sliding movement (+/−2 mm).

According to a second aspect of the present invention there is provided a method of calibrating a variable nozzle turbocharger comprising the steps of:

a) using an actuator assembly which has a spaded rod;
b) using at least one bolt to attach the actuator assembly to an end housing (of either a compressor or a turbine) which has a pin crank so that the spaded rod is adjacent to the pin crank;
c) applying a predetermined vacuum to the actuator, through an actuator port to allow the actuator to take a calibrated position determined by gravity;
d) keeping the pin crank in contact with the flow screw of the turbocharger;
e) tightening the or each bolt, at a predetermined torque, to tighten the attachment of the actuator assembly to the end housing;
f) controlling the actuator calibration in accordance with predetermined process instructions;
g) determining whether the calibration process is correct and if it is not correct then repeating the process from step c) using a different predetermined vacuum value.

According to a preferred embodiment of the second aspect of the invention the method is conducted using the actuator assembly of the first aspect.

The compact design of the new actuator and the novel calibration procedure enable application of a VNT in confined spaces where conventional parts would be difficult or impossible to fit and adjust. In addition, automation of the calibration process is enabled, providing increased production line capacity.

BRIEF DESCRIPTION OF THE DRAWINGS

For a better understanding of the present invention, and to show how the same may be carried into effect, reference will now be made to the accompanying drawings, in which.

DETAILED DESCRIPTION OF THE PREFERRED EMBODIMENTS

Figure 1:
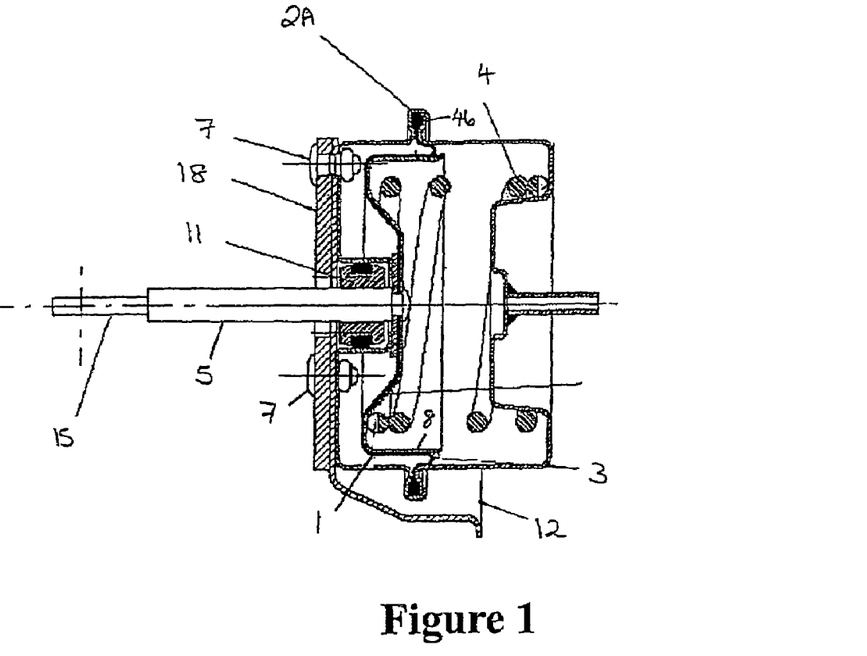
FIG. 1 is a cross-section of an actuator for a variable nozzle turbocharger according to one embodiment of the invention.
Figure 1A:
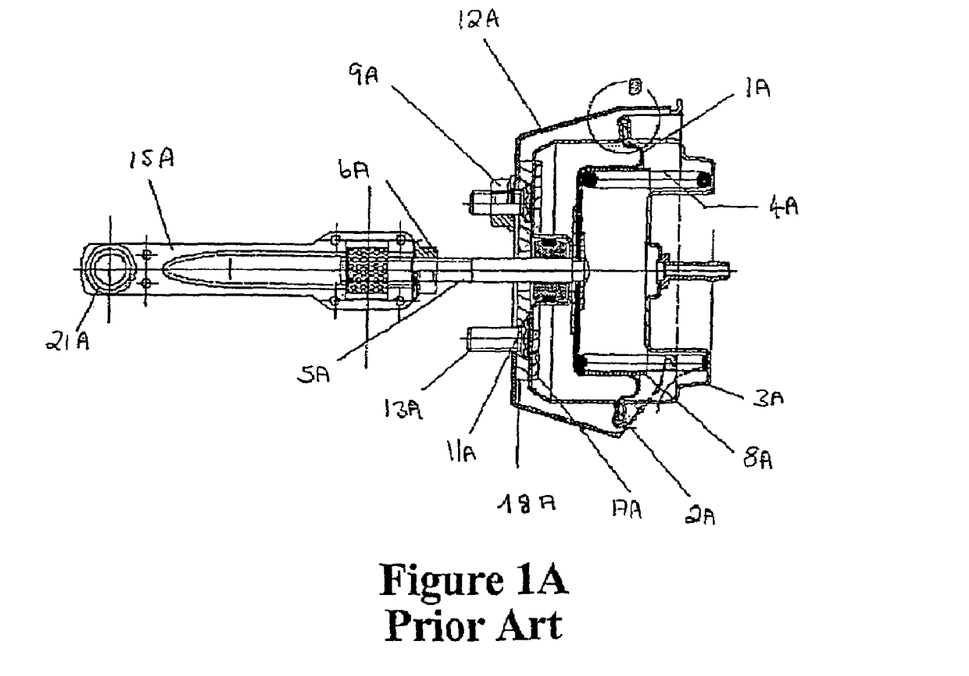
FIG. 1A is a cross section of an actuator for a variable nozzle turbocharger showing a design according to the prior art.

In FIG. 1A the known actuator assembly comprises a diaphragm 1A crimped at 2A into the side wall of an actuator assembly 3A. A spring 4A holds the diaphragm 1A taut and controls the position of actuator piston 8A. Two sets of bolts and nuts, of which one is shown at 9A, are used to hold the bottom wall of the actuator assembly 3A to a bracket assembly 18A which in turn will be connected to a turbine housing (not shown). A calibration rod 5A extends through a gimball 11A and is held in place by a locknut 6A and is fixed at one end to the actuator piston 8A. A heat shield 12A protects the actuator. A stud 13A passes through the bottom wall of the actuator assembly 3A and a double plate 17A.

The rod 5A has an adjustable rod end 15A and a bolt hole 21A for fixing to either the compressor or the turbine housing of the turbocharger.

By contrast, in FIG. 1, a modified actuator assembly is shown according to the invention. The two bolts and nuts 9A are replaced by three rivets, of which two are shown at 7, and the actuator assembly 3 combines the functions of actuator assembly and bracket assembly. The rod end 5A and the locknut 6A are replaced by a rod 5 with spaded (flattened) end portion 15 shown in profile in FIG. 1. This new shape for the rod end assists the calibration process as will be described later. A spaded rod is a design known for use in wastegated turbochargers but has not hitherto been used in variable nozzle technology because the calibration process is not the same. Specifically the spaded rod 5 has a flat portion at one end formed by cold forging with a hole to be connected to the pin crank of the turbocharger. A compression spring 4, in the inventive modification, is centered in the actuator assembly 3 and this reduces the hysteresis, ie the inaccuracies, particularly in calibration, due to the imperfections in the spring 4 itself. The diaphragm 1 is crimped into the side wall 3 of the actuator assembly at 2 and this is improved in the invention by a crimping control achieved by the addition of elastomer bead 46 on the diaphragm 1. Elastomer bead can accept more variation in compression during the crimping process used to close the actuator than a flat shape which is traditionally used by the applicant, or a metal to metal contact as traditionally used by other people in the field.

The elastomer bead 46 also improves the seal capability. The convolution of the diaphragm 1 has a reduced width to reduce the diaphragm stress and the overall diameter of the actuator.

In addition, the piston 8 has a shape modification which reduces the overall length of the actuator assembly, as can be seen by comparing FIG. 1 with FIG. 1A. The new bracket is shown at 18 and the gimble is shown unchanged at 11.

The piston 8 must withstand 1.7 NM torque, with respect to the rod end 5, without relative motion. The engineering requirements are 0.15 SCCM max under 1.5 bars and a pull test of 100 Kg.

Figure 2:
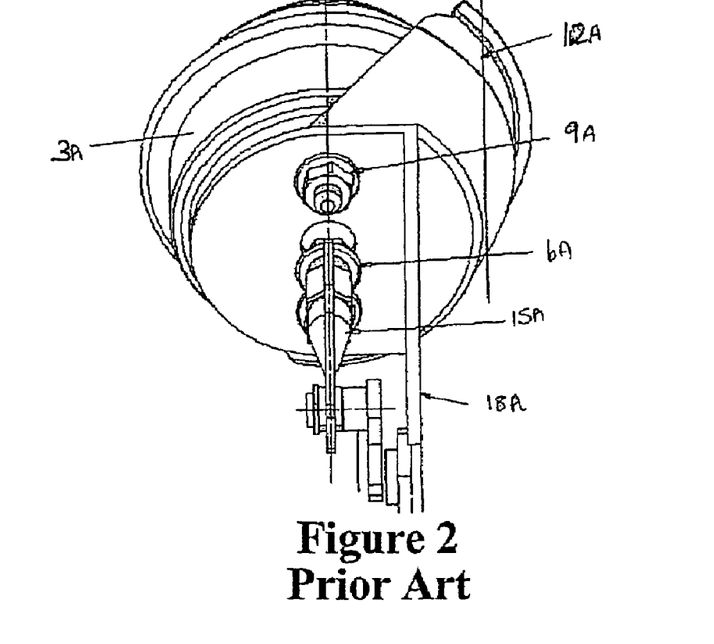
FIG. 2 is a perspective view of part of the known actuator of FIG. 1A.

FIG. 2 is a perspective view from below of a traditional design of a turbocharger actuator assembly, ie a view from below of the assembly in the left hand side of FIG. 1. The heat shield 12A is shown part cut-away and the side wall of the actuator assembly 3A is attached to the bracket assembly 18A by two nuts 9A. The rod end 15A is held in place by a locknut 6A and is adjustable. Thus, traditionally, calibration is effected by two fixed end points with a manually adjustable connecting rod and end.

Figure 3:
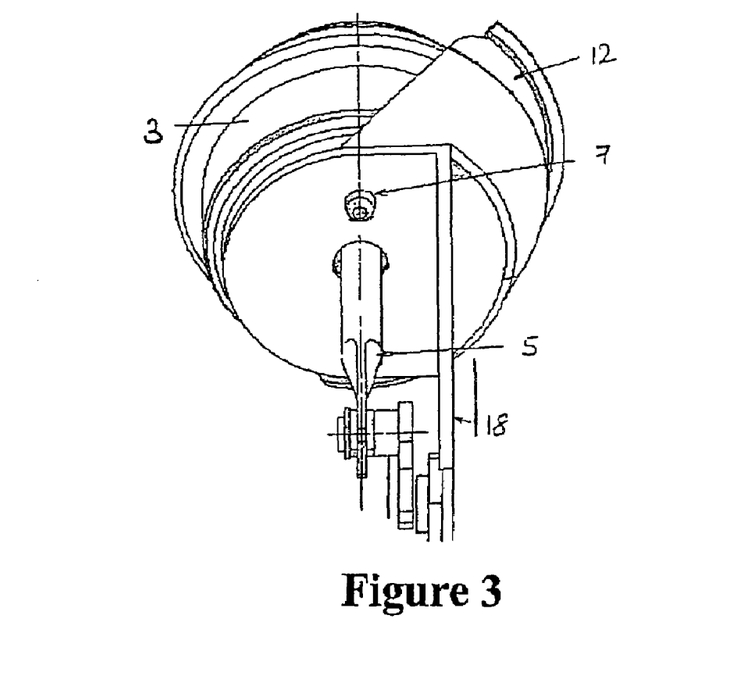
FIG. 3 is a perspective view of part of the actuator of FIG. 1, according to one embodiment of the invention.

By contrast, the inventive actuator assembly of FIG. 3 has a side wall of actuator 3 held to the bracket assembly 18 by the three rivets 7 and no locknut is needed because the rod 5 is spaded at the end 15 and of fixed length. Thus, the actuator end-point is allowed to move, and the rod and the second end point are fixed. When a calibrated vacuum is applied to the actuator, the actuator body is moved towards the fixed end point until forces are equalized. The actuator 3 is then in the calibrated position and is fixed to the compressor or the turbine housing by accessible bolts and bracket.

Figure 4:
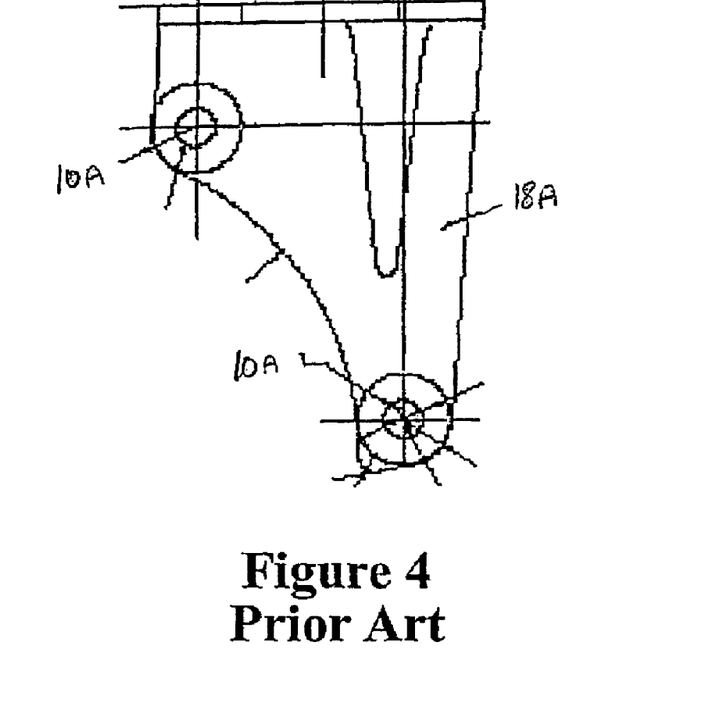
FIG. 4 is a side view of a known bracket for fixing the known actuator of FIG. 2 to a variable nozzle turbocharger.

The traditional shape of the bracket 18A is shown in detail in the plan drawing of FIG. 4 which also shows the positions of two bolts 10A which hold the bracket 18A to a traditional turbocharger body. Such an arrangement is shown in the side view of FIG. 6 where a traditional turbocharger 20 is attached to a traditional actuator 30A by the traditional bracket 18A which is attached to the actuator by two bolts and nuts 19A. The traditional adjustable rod end 15A is shown.

Figure 5:
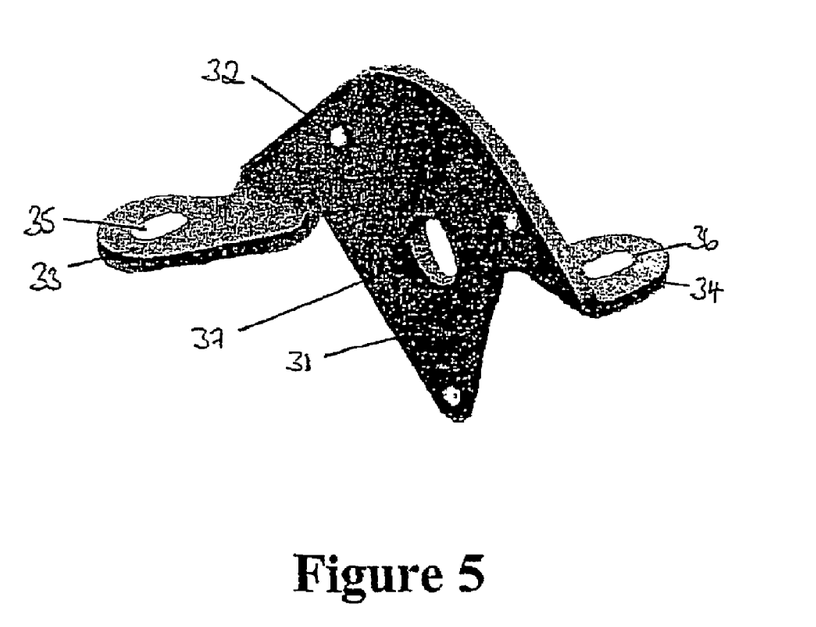
FIG. 5 is a perspective view of one embodiment of a new bracket for fixing the new actuator of FIG. 3 to a variable nozzle turbocharger.

In FIG. 5 the shape of the new bracket 18 is shown with a generally triangular plate section 31 having three rivet holes 32, and two bent sections 33 and 34 having elongate bolt holes 35 and 36 respectively. A central hole 37 accommodates the fixed length new shaped rod 5 with end 15. As shown in the side view of FIG. 7, the new bracket 18 is used to connect the new actuator body 30 to a turbocharger 20. The plate section 31 is riveted to the actuator housing by three rivets 7 and the bent portions 33 and 34 are connected to the turbocharger 20 either to the turbine housing or the compressor housing by two bolts 38 through the slot shaped holes 35 and 36. The elongate shape of the holes 35, 36 allows adjustment during calibration and obviates the need for the rod end 15 on the actuator 30 to be adjustable.

Figure 6:
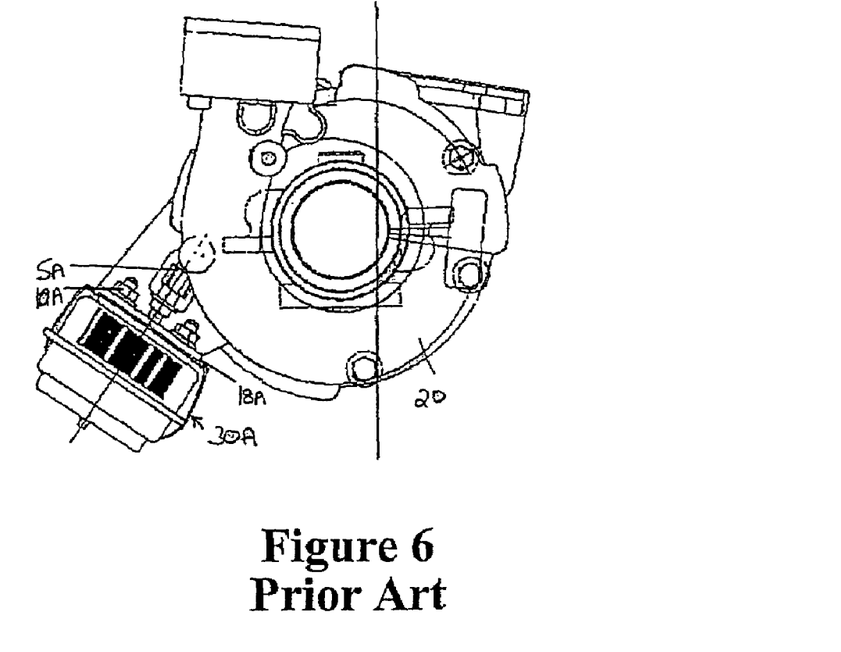
FIG. 6 is a side elevation view of the known actuator of FIG. 2 attached by the known bracket of FIG. 4 to a variable nozzle turbocharger.

FIG. 6 shows a traditional actuator assembly 30A, such as that shown in FIG. 2 and of FIG. 1A, attached to a turbine housing 20 by means of the bracket of FIG. 4 by means of bolts and nuts 19A. The rod end 15A is shown.

Figure 7:
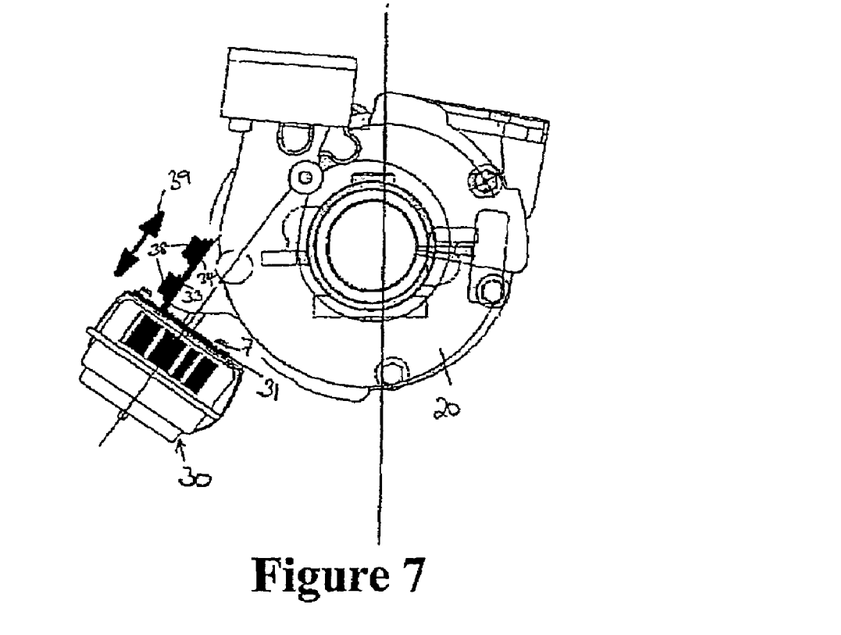
FIG. 7 is a side elevation view of the new actuator of FIG. 3 attached by the new bracket of FIG. 5 to a variable nozzle turbocharger.

FIG. 7 shows a new actuator assembly 30, such as that shown in FIG. 3 and FIG. 1, attached to a turbine housing 20 by means of the bracket of FIG. 5. The attachment is by rivets 7 through the first portion of the bracket 31 and bolts 38 through at least the second portion of the bracket allowing a sliding movement of the actuator 30 relative to the turbine housing 20 as shown by the arrow 39.

Figure 8:
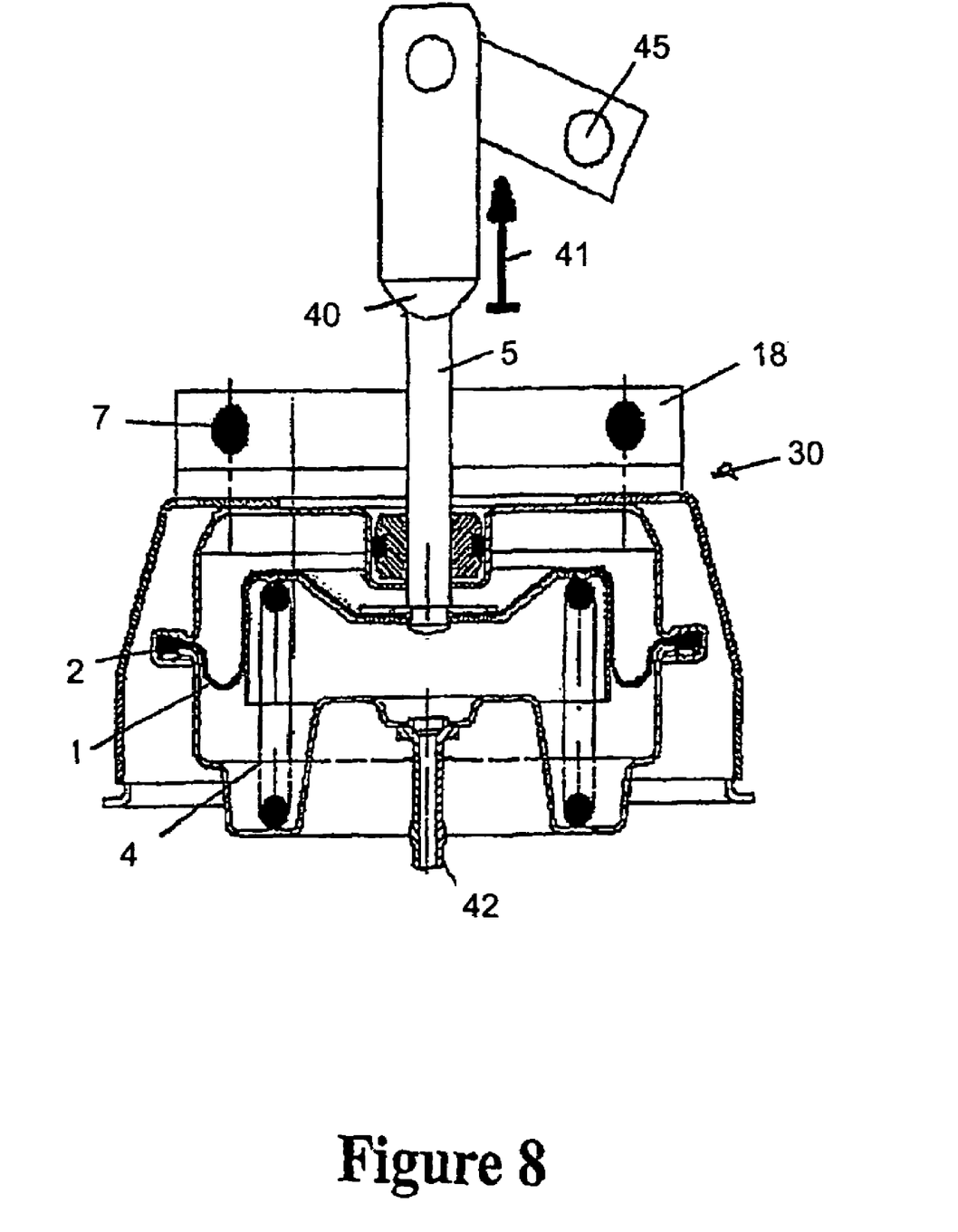
FIG. 8 is a cross-sectional view of the new actuator of FIG. 3 illustrating the new calibration method.

FIG. 8 illustrates the new calibration method and comprises a cross sectional view of the inventive actuator.

The new calibration process comprises attaching the actuator 30 and bracket assembly 18 onto the turbocharger 20 in a vertical position with the actuator head down and the spaded rod 5 adjacent to the pin crank 40. Vacuum is applied to the actuator port 42. The actuator will naturally take its calibrated position under the influence of gravity. The pin crank 40 is put in contact with the VNT flow screw 45 as shown by the arrow 41. The attachment bolts 38 (FIG. 7) are then tightened at the required torque and the actuator calibration is controlled according to normal process instructions. If the actuator calibration is not correct, then the bolts 38 are unscrewed and the process is repeated from step 2 with a modified vacuum value.

Figure 9:
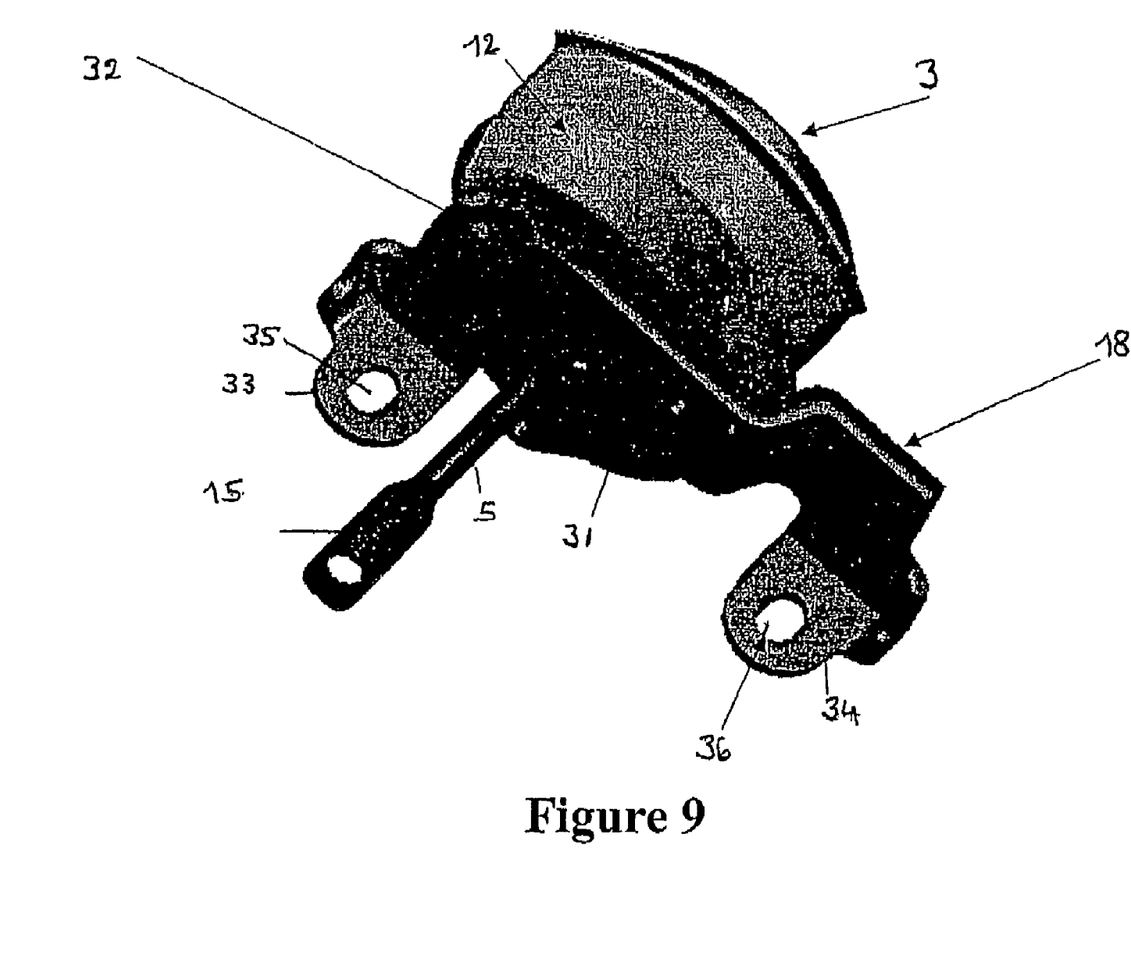
FIG. 9 is a perspective view of the new actuator and another embodiment of a new bracket.

FIG. 9 shows the new actuator 3 assembled to the bracket 18 and shows the rod 5 and spaded rod end 15 together with the rivet holes 32 and the slot holes 35, 36 in the bent portions 33, 34 respectively. The slot-type holes 35, 36 accept a sliding movement. The heat shield 12 is also shown.

The invention claimed is:

1. A method of affixing an actuator that includes an actuator housing, an actuator port and a rod, to a variable nozzle turbocharger having a turbocharger housing and a pin crank, comprising the steps of:
  i) moving the actuator body to a calibrated position by
    a) applying a predetermined vacuum to the actuator, through the actuator port, to move the actuator rod to an actuated position with respect to the actuator housing, and
    b) positioning the rod with respect to the pin crank,
    c) wherein the calibrated position is determined by the position of the actuator body with the actuator rod in the actuated position with respect to the actuator housing, and with the rod positioned with respect to the pin crank; and
  ii) subsequent to the step of moving, fastening the actuator housing to the turbocharger housing in the calibrated position.

2. A method according to claim 1, and further comprising determining whether the actuator housing is fastened to the turbocharger housing in a correct position, and if it is not in a correct position, then:
  d) unfastening the actuator housing from the turbocharger housing; and
  e) repeating the process from step b) using a different predetermined vacuum.

3. A method according to claim 1, wherein the step of applying the predetermined vacuum is done after the step of positioning the rod.

4. A method of calibrating a variable nozzle turbocharger having a housing, a flow screw and a pin crank, comprising the steps of:
  a) using an actuator which has a rod;
  b) using at least one bolt to attach the actuator to the turbocharger so that the rod is adjacent to the pin crank;
  c) applying a predetermined vacuum to the actuator, through an actuator port, to allow the actuator to take a calibrated position determined by gravity;
  d) keeping the pin crank in contact with the flow screw of the turbocharger;
  e) tightening the or each bolt, at a predetermined torque, to tighten the attachment of the actuator assembly to the housing; and
  f) determining whether the calibration process is correct variable nozzle turbocharger is calibrated correctly, and if it is not correct calibrated correctly, then repeating the process from step c) using a different predetermined vacuum value.

5. A method according to claim 4, wherein in the step (b), the rod is spaded at one end and of a fixed length.

6. An actuator for a variable nozzle turbocharger having a turbocharger housing, comprising:
  an actuator housing;
  a piston;
  a diaphragm, connected across the actuator housing;
  at least one compression spring arranged to be generally centered in the actuator housing and to bias the piston;
  a rod, connected to the piston, for calibrating the turbocharger; and
  a bracket comprising a first plate section configured for fixedly connecting with the actuator housing, and a second section extending generally perpendicular to the first plate section and having an elongate hole formed therein to receive a means for attaching the bracket to the turbocharger housing, the elongate hole allowing a sliding movement of the actuator relative to the turbocharger housing.

7. An actuator according to claim 6, wherein the bracket further comprises a third section extending perpendicular to the first plate section and being generally parallel to the second section, the third section having an elongate hole formed therein to receive a bolt to attach the bracket to the turbocharger housing, the elongate hole allowing a sliding movement of the actuator relative to the turbocharger housing.

8. An actuator according to claim 6, wherein the elongate hole allows approximately 4 mm of sliding movement.

9. An actuator according to claim 6, wherein the actuator housing is connected to the bracket using at least one rivet.

10. An actuator according to claim 9, wherein the actuator housing is connected to the bracket using three rivets.

11. A turbocharger comprising a turbine, a compressor and an actuator, for controlling movement of the piston to control a gas inlet to the turbine or an air inlet to the compressor, wherein the actuator is configured according to claim 10.

12. An actuator according to claim 6, wherein the diaphragm is crimped to connect it to the actuator housing.

13. An actuator according to claim 6, wherein the diaphragm is coated with elastomer bead.

14. A turbocharger comprising a turbine, a compressor and an actuator, for controlling movement of the piston to control a gas inlet to the turbine or an air inlet to the compressor, wherein the actuator is configured according to claims 6, 7, 8, 9, 12, or 13.

15. A method of calibrating a variable nozzle turbocharger having a flow screw and a pin crank, comprising the steps of:
  a) using an actuator according to claims 6, 7, 8, 9, 10, 12, or 13;
  b) using at least one bolt to attach the actuator to the turbocharger so that the rod is 5 adjacent to the pin crank;
  c) applying a predetermined vacuum to the actuator, through an actuator port, to allow the actuator to take a calibrated position determined by gravity;
  d) keeping the pin crank in contact with the flow screw of the turbocharger;
  e) tightening the or each bolt, at a predetermined torque, to tighten the attachment of the actuator assembly to an end housing; and
  f) determining whether the variable nozzle turbocharger is calibrated correctly, and if it is not calibrated correctly, then repeating the process from step c) using a different predetermined vacuum value.

16. A method according to claim 15, wherein in the step (b), the rod is spaded at one end and of a fixed length.

17. An actuator according to claim 6, wherein the rod is spaded at one end and of a fixed length.

18. A turbocharger comprising a turbine, a compressor and an actuator, for controlling movement of the piston to control a gas inlet to the turbine or an air inlet to the compressor, wherein the actuator is configured according to claim 17.

19. An actuator according to claim 1, wherein:
  the bracket further comprises a third section extending perpendicular to the first plate section and being generally parallel to the second section, the third section having an elongate hole formed therein to receive a bolt to attach the bracket to the turbocharger housing, the elongate hole allowing a sliding movement of the actuator relative to the turbocharger housing;

each elongate hole allows approximately 4 mm of sliding movement;

the actuator housing is connected to the bracket using three rivets;

the diaphragm is crimped to connect it to the actuator housing;

the diaphragm is coated with elastomer bead; and the rod is spaded at one end and of a fixed length.

* * * * *